May 16, 1939.   W. BRINTZINGER   2,158,894
TESTING PLANT FOR INTERNAL COMBUSTION ENGINES
Filed May 20, 1936   2 Sheets-Sheet 1
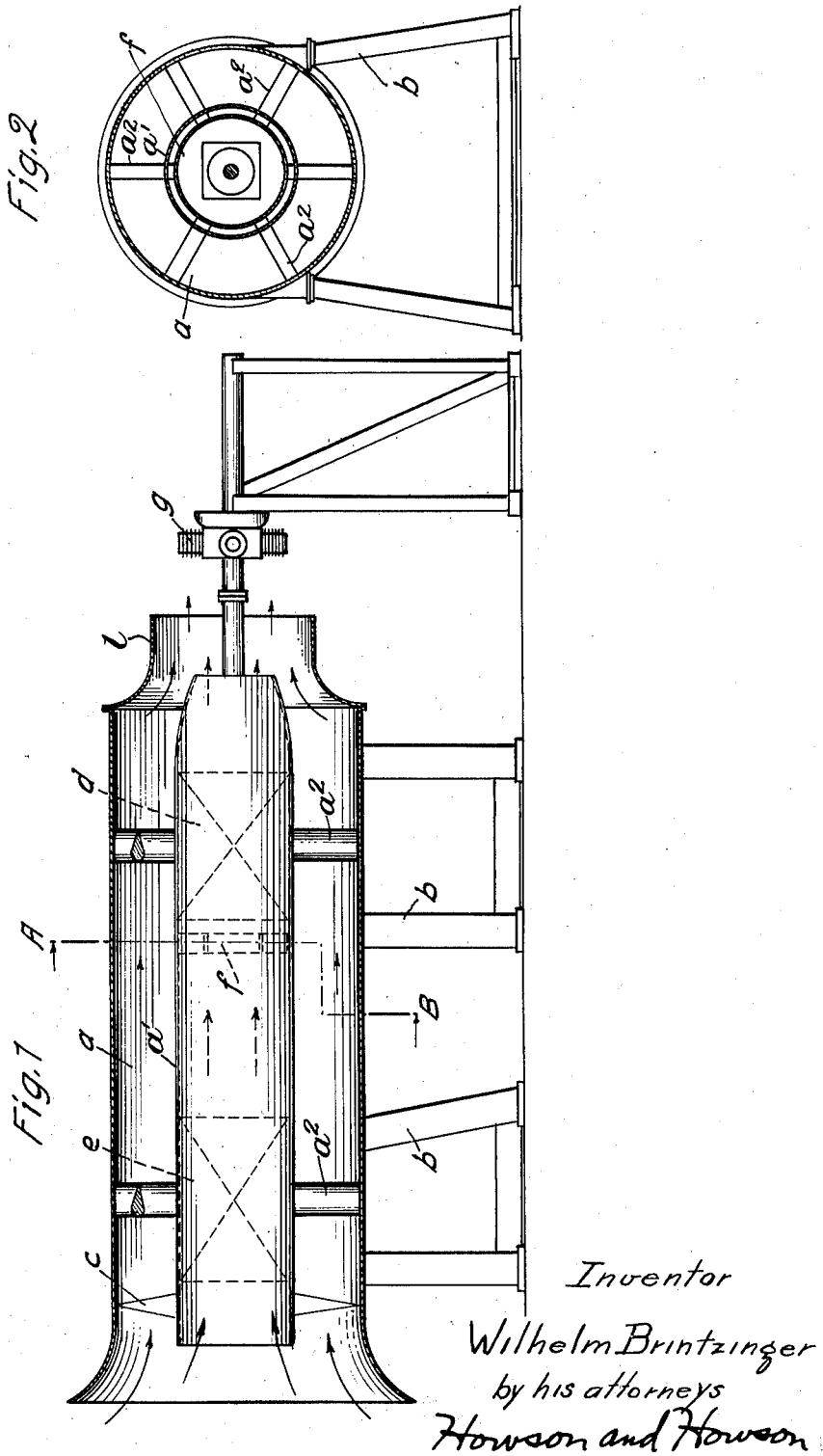
Inventor
Wilhelm Brintzinger
by his attorneys
Howson and Howson

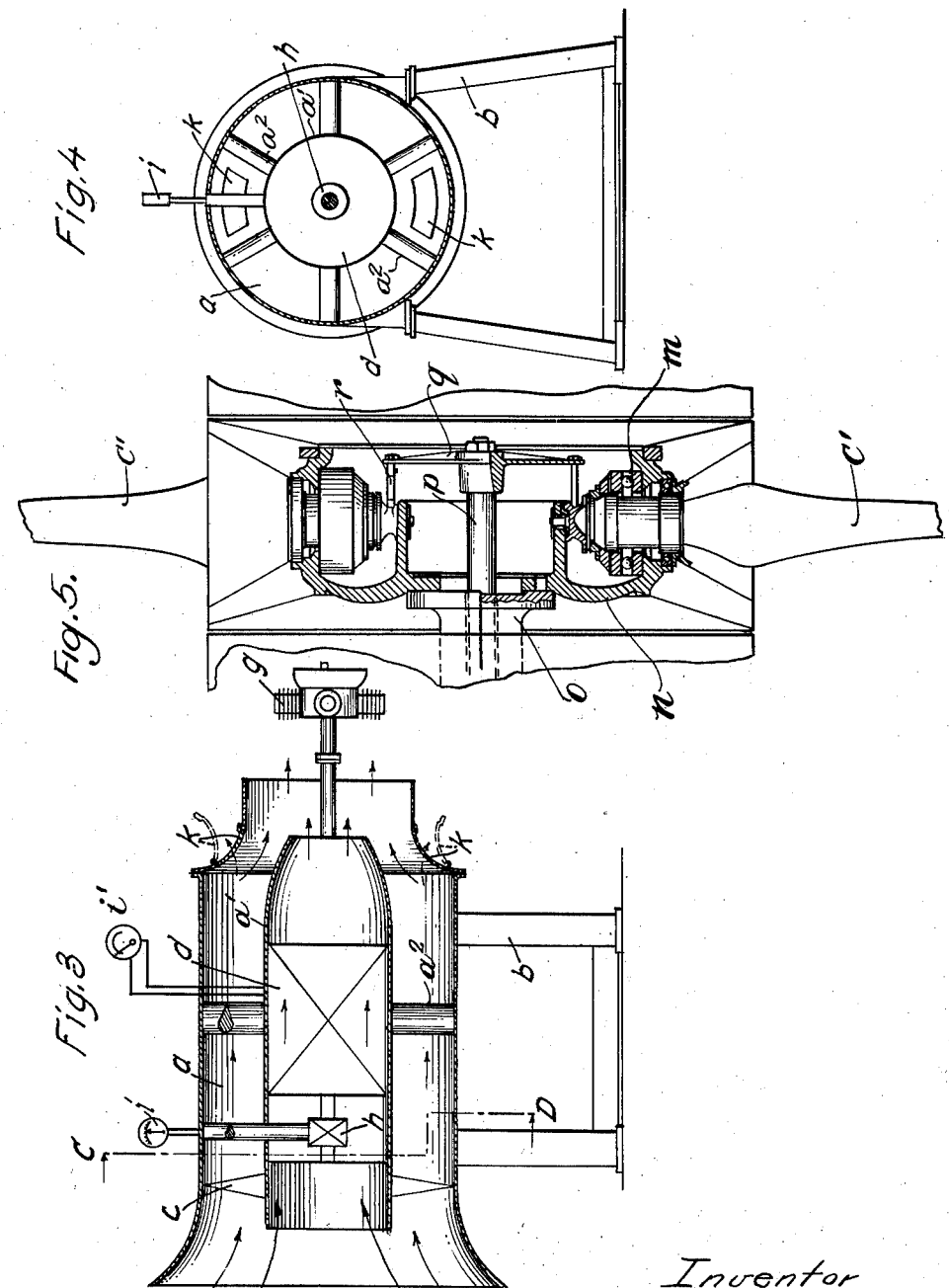

Patented May 16, 1939

2,158,894

UNITED STATES PATENT OFFICE 2,158,894

TESTING PLANT FOR INTERNAL COMBUSTION ENGINES

Wilhelm Brintzinger, Berlin-Johannisthal, Germany

Application May 20, 1936, Serial No. 80,863
In Germany May 21, 1935

8 Claims. (Cl. 73—51)

The present invention relates to a testing plant for internal combustion engines, in particular for motors used with aircraft, in which a braking arrangement and a ventilator or blower for producing cooling air for the motor, are provided.

The invention has for object to reduce the extent of the testing plant as far as possible, to utilize the capacity of the blower to a wide extent and to conduct the cooling air in such a manner, that it will be admitted to the engine to be tested in a uniform manner, particularly under the same conditions as such will prevail during the operation of the propeller in actual flight.

According to the invention this result is obtained in that the brake as well as the ventilator or blower are arranged in axial alinement and located in a wind channel, which will conduct the cooling air agitated by the blower past the brake towards the motor situated outside the said wind channel.

A preferred arrangement of the testing plant according to the present invention consists in having the motor arranged in axial alinement in common with the said brake and blower. Also in this instance the motor is situated outside the wind channel. By the term "shaft of the motor" is to be understood that shaft of the latter, upon which is mounted the propeller in actual flight. The arrangement of the brake and blower within the wind channel is preferably made concentrically within the latter, in order to insure a uniform motion of the air.

Two modifications of the invention are represented in the drawings by way of example, in which:

Figure 1 is a side view with the wind channel in section.

Figure 2 is a section along line A—B in Figure 1.

Figure 3 shows another modification in side-view with the wind channel in section, and Figure 4 is a section through the said arrangement along the line C—D in Figure 3.

Fig. 5 is a more or less diagrammatic view showing one means of adjusting the blower vanes.

Referring to the drawings $a$ is a wind channel mounted on a support $b$, within which channel the ventilator or blower $c$ and the complete braking device $d$, for instance in the form of a pendulum generator, are arranged perfectly symmetrically and in axial alinement. The blower $c$ is designed as a helical blower and compression blower.

In the modification illustrated in Figure 1 there is arranged in the rear of the blower $c$ a motor $e$ and behind the latter the cooler $f$ for cooling the air which cools the motor $e$ and generator $d$. The whole arrangement is so chosen, that both the channel $a$ as well as the portion of the machine, consisting of the individual parts of the testing plant, are perfectly symmetrical and provided with smooth surfaces, so that the resistance to the current of air is reduced to the smallest value possible.

The motor $e$, cooler $f$ and brake $d$ are supported coaxially in an open ended tube $a^1$ which is held in axial alignment within the wind tunnel by suitable supports $a^2$ so that air flows through and around said tube, the outer surface of the tube being smooth so as to offer minimum resistance to air flow.

Outside of the wind channel $a$ or behind it respectively, is arranged on the same shaft the object $g$ to be tested in the form of any desired type of air-cooled motor, in such a manner, that its cylinders are fully met by the current of air produced by the ventilator or blower $c$ and conducted through the wind channel $a$, the end of the wind channel $a$ adjacent the motor $g$ being contracted as at $l$ to form a nozzle directing the cooling air towards the motor $g$.

By using a helical blower as compression blower in axial alinement with the braking device very short constructional dimensions are obtained. The provision of entirely smooth surfaces on the braking device and the air conducting means increase by virtue of the reduction of the air-resistance the efficiency of the blower. The symmetrical construction provides a uniform distribution of the air supplied to the object to be tested.

If electrical braking means are used, the oscillating column of the electric motor may be directly subjected to the jet of cooling air, which will result in an additional increase of the efficiency of the said brake. For the purpose of a favorable conduct of the air and in order to prevent any disturbances through air discharged on the jacket of the machine, the air passing the driving means of the blower may also be utilized for cooling the electrical brake. If necessary, the air may be passed through an air cooling device mounted between the motor of the blower and the brake, by which arrangement the air will be further cooled. Said cooling means may be of a construction, for instance, similar to a motor-car cooler, being fed with cooling water (see Figures 1 and 2).

If the helical blower is provided with adjustable vanes, in which instance it is without importance to the invention, in which manner the adjustment of the vanes is effected, there is an additional possibility of application of the device. On the one hand the ventilating device may be actuated by means of a motor, having a constant number of revolutions and the velocity of the current of the cooling air may be changed at will through an adjustment of the vanes. But on the other hand the ventilating device may be secured directly to the shaft of the braking device, so that in this instance a special prime mover will be dispensed with, as such is illustrated by way of example in Figure 3. In Figure 5 I have shown one manner of adjusting the blower vanes wherein the vanes $c'$ are arranged so as to turn in hub $n$ provided with a guide bearing and a thrust bearing $m$. Turning is effected through levers $r$ secured to the base of the blades by arms. The levers are attached to a spider $q$ carried on reciprocating shaft $p$. Any suitable means may be employed to displace the shaft $p$ axially and thereby adjust the vanes. In order to register and ascertain the efficiency given to the blower suitable coupling elements $h$ may be used, which will permit of measuring the torque at this point, for instance with the aid of a dynamometer $i$ (see Figures 3 and 4). But it is also possible to obtain the torque through similar coupling elements arranged between the brake and the object to be tested such as by the meter $i'$. At any rate it is possible to obtain adequate velocities of the current of air impinging on the object to be tested, even with relatively low numbers of revolution by the adjustment of the vanes. Finally, in special cases, particularly in such instances where the brake will not suffice, it is possible to utilize the blower as a brake for the tested motor, and the output of the blower which is in excess, which will not be required for the cooling of the tested motor, may be controlled by means of auxiliary flaps $k$ (Figures 3 and 4).

With this arrangement is obtained the shortest construction possible at all in respect of such a testing plant.

I claim:

1. In a testing plant for internal combustion engines, particularly for motors for air craft of the character described comprising in combination: a braking device; a blower for producing cooling air for the motor being tested, a cylindrical wind channel within which the said brake and blower are arranged in axial alignment with said wind channel, said wind channel being shaped to provide a nozzle directing the cooling air towards the motor being tested.

2. In a motor testing plant of the character described, comprising in combination: a braking device; a blower for producing cooling air for the said motor being tested, driving means for said blower, a cylindrical wind channel within which the said brake, blower and driving means are arranged in axial alignment with said wind channel, said wind channel being shaped to provide a nozzle directing the cooling air towards the motor being tested, air cooling means between said blower and brake and a support for the driving means and brake, said support being a perfectly smooth and symmetrical construction.

3. In a motor testing plant of the character described, comprising in combination: a braking device; a blower for producing cooling air for the motor being tested, a cylindrical wind channel in which said blower and braking device are axially aligned with said wind channel, said wind channel being shaped to provide a nozzle directing the cooling air towards the motor being tested, and driving means for said blower mounted in said wind channel, said driving and braking means having a perfectly smooth outer surface.

4. In a motor testing plant of the character described, comprising in combination: a braking device; a blower for producing the cooling air for the motor being tested, driving means for said blower, a cylindrical wind channel in which said blower, driving means and braking device are axially aligned with said wind channel, said blower comprising a propeller fan in back of said braking device and means for cooling the air applied to said driving means and braking means arranged between the driving means and the braking means.

5. In a motor testing plant of the character described, comprising in combination: a braking device, a blower for producing cooling air for the motor being tested, driving means for said blower, a cylindrical wind channel in which said blower, driving means and braking device are axially alined wtih said wind channel, said blower comprising a helical blower having adjustable blades and arranged as a compression blower.

6. In a motor testing plant of the character described, comprising in combination: a braking device, a blower for producing cooling air for the motor being tested, driving means for the blower, a cylindrical wind channel in which said blower, driving means and braking means are axially arranged, said blower operating as a helical blower, and means for adjusting the vanes of said blower.

7. In a motor testing plant of the character described, comprising in combination: a braking device comprising a braking generator; a blower for producing cooling air for the motor being tested; a cylindrical wind channel in which said blower and braking device are axially arranged; driving means for the said blower, means for coupling the said braking generator to the blower directly; said coupling means comprising an indicating device adapted to indicate output of the blower, and additional indicating means for separately measuring the energy received by the said brake.

8. In a motor testing plant of the character described, comprising in combination: a braking device, a blower for producing cooling air for the motor being tested, a cylindrical wind channel in which said blower and braking device are axially arranged; driving means for the said blower and means for discharging air from the wind channel to by-pass excess air past the motor to be tested.

WILHELM BRINTZINGER.